US008505874B2

(12) United States Patent
Shimizu

(10) Patent No.: US 8,505,874 B2
(45) Date of Patent: Aug. 13, 2013

(54) ADJUSTING SCREW STRUCTURE OF OIL IMMERSED SOLENOID AND OIL IMMERSED SOLENOID INCLUDING THE SAME

(75) Inventor: Hiroaki Shimizu, Kakogawa (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 252 days.

(21) Appl. No.: 13/063,188

(22) PCT Filed: Aug. 26, 2009

(86) PCT No.: PCT/JP2009/004110
§ 371 (c)(1),
(2), (4) Date: Mar. 23, 2011

(87) PCT Pub. No.: WO2010/029695
PCT Pub. Date: Mar. 18, 2010

(65) Prior Publication Data

US 2011/0168933 A1 Jul. 14, 2011

(30) Foreign Application Priority Data

Sep. 11, 2008 (JP) ................................ 2008-233896

(51) Int. Cl.
*F16K 31/02* (2006.01)

(52) U.S. Cl.
USPC .................. 251/129.18; 251/129.07; 335/298

(58) Field of Classification Search
USPC ............. 251/129.01, 129.07, 129.15, 129.18; 335/297, 298
See application file for complete search history.

(56) References Cited

U.S. PATENT DOCUMENTS 3,565,111 A * 2/1971 Pearson .................. 137/596.17
4,339,109 A 7/1982 Kawata et al.
4,521,759 A 6/1985 Gibas (Continued)

FOREIGN PATENT DOCUMENTS

DE 2639274 A1 3/1978
DE 4438158 A1 5/1995

(Continued)

OTHER PUBLICATIONS

ISA Japanese Patent Office, International Search Report of PCT/JP2009/004024, Nov. 17, 2009, 2 pages.

(Continued)

*Primary Examiner* — John K Fristoe, Jr.
*Assistant Examiner* — Ian Paquette
(74) *Attorney, Agent, or Firm* — Alleman Hall McCoy Russell & Tuttle LLP

(57) ABSTRACT

An adjusting screw structure of an oil immersed solenoid comprises a movable core provided in a first space of a main body case to be movable in an axial direction. The core is biased by an adjusting spring to be pulled by a fixed magnetic pole portion. An adjusting screw capable of adjusting biasing force of the adjusting spring is included. The adjusting screw structure includes an air-bleeding plug configured to detachably attach to and seal an opening end portion of a rear case, which communicates with the first space. The air-bleeding plug includes an internal screw portion that threadedly engages the adjustable screw. A detachable mechanism is configured to attach the air-bleeding plug to the opening end portion, locating the air-bleeding plug at a predetermined attachment position in a movement direction of the adjusting screw. Thus, air in a solenoid can be removed without causing a biasing force error.

5 Claims, 6 Drawing Sheets

(56) References Cited

U.S. PATENT DOCUMENTS

| | | | | |
|---|---|---|---|---|
| 4,603,832 | A * | 8/1986 | Sjoquist | 251/30.02 |
| 4,954,799 | A * | 9/1990 | Kumar | 335/236 |
| 5,050,840 | A | 9/1991 | Kondo et al. | |
| 5,204,652 | A * | 4/1993 | Baker et al. | 335/238 |
| 5,509,439 | A | 4/1996 | Tantardini | |
| 5,611,370 | A * | 3/1997 | Najmolhoda | 137/625.61 |
| 5,899,436 | A * | 5/1999 | Holmes et al. | 251/129.15 |
| 6,050,542 | A * | 4/2000 | Johnson et al. | 251/129.15 |
| 6,628,186 | B1 * | 9/2003 | Wolfges | 335/220 |
| 7,973,627 | B2 | 7/2011 | Yamagata et al. | |
| 2002/0057153 | A1 | 5/2002 | Matsusaka et al. | |
| 2005/0025632 | A1 | 2/2005 | Urbank et al. | |
| 2008/0216899 | A1 * | 9/2008 | Moreno et al. | 137/219 |
| 2009/0140189 | A1 | 6/2009 | Kokubu et al. | |
| 2009/0236551 | A1 | 9/2009 | Nomichi et al. | |
| 2010/0301244 | A1 | 12/2010 | Gruen et al. | |
| 2011/0147629 | A1 | 6/2011 | Gruen et al. | |
| 2011/0168933 | A1 | 7/2011 | Shimizu | |

FOREIGN PATENT DOCUMENTS

| | | | |
|---|---|---|---|
| EP | 0428728 | A1 | 5/1991 |
| EP | 0464370 | A1 | 1/1992 |
| EP | 0465813 | A1 | 1/1992 |
| EP | 0552416 | A1 | 7/1993 |
| EP | 1855296 | A2 | 11/2007 |
| EP | 1887677 | A1 | 2/2008 |
| FR | 2728721 | A1 | 6/1996 |
| JP | 61-44811 | | 3/1986 |
| JP | 61168214 | | 7/1986 |
| JP | 64-48005 | | 3/1989 |
| JP | 3-80172 | | 8/1991 |
| JP | 5-52460 | | 7/1993 |
| JP | 6-2620 | | 1/1994 |
| JP | 07-302709 | | 11/1995 |
| JP | 63-145078 | | 9/1998 |
| JP | 2000-018416 | A | 1/2000 |
| JP | 2000-161527 | A | 6/2000 |
| JP | 2005-277306 | A | 10/2005 |
| JP | 2006-140417 | A | 6/2006 |
| WO | 2010012394 | A1 | 2/2010 |

OTHER PUBLICATIONS

Shimizu, Hiroaki, "Oil Immersed Solenoid," U.S. Appl. No. 13/063,184, filed Mar. 9, 2011, 25 pages.

ISA European Patent Office, Extended European Search Report of EP09812837.4, Oct. 12, 2011, Germany, 9 pages.

ISA Japanese Patent Office, International Search Report of PCT/JP2009/004110, Nov. 24, 2009, 2 pages.

* cited by examiner

ADJUSTING SCREW STRUCTURE OF OIL IMMERSED SOLENOID AND OIL IMMERSED SOLENOID INCLUDING THE SAME

TECHNICAL FIELD

The present invention relates to an adjusting screw structure of an oil immersed solenoid used in an oil-pressure device, such as a valve device, used in a construction machinery or the like, and an oil immersed solenoid including the adjusting screw structure.

BACKGROUND ART

One example of such oil immersed solenoid is shown in FIG. 9. The oil immersed solenoid is used to control the oil pressure and flow rate of operating oil flowing in a valve device (not shown) that is, for example, an oil-pressure device. To be specific, in an oil immersed solenoid 1, when a command electric signal (exciting current) is transmitted to an exciting coil 2, pulling force (pulling force in a left direction in FIG. 9) corresponding to the magnitude of the command electric signal is generated at a fixed magnetic pole portion 3, and the fixed magnetic pole portion 3 can pull a movable core 4 by the pulling force. When the movable core 4 is pulled, a rod 5 provided at the movable core 4 presses, for example, a spool of the valve device (not shown) in the left direction in FIG. 9. This pressing force balances push-back force (push-back force in a right direction in FIG. 9) based on, for example, spring force or pilot pressure applied to the spool. The spool stops at a position where the pressing force and the push-back force are balanced. With this, the oil pressure and flow rate of the operating oil flowing in the valve device can be controlled so as to be proportional to the command electric signal.

However, if air and air bubbles exist in the oil, such as the operating oil, in the space 6 of the oil immersed solenoid 1, this may cause an irregular change in acceleration of the movable core 4, and chattering of the movable core 4 may occur.

Here, in order to remove the air and the air bubbles in the space 6 of the solenoid 1, an adjusting screw 9 is provided to threadedly engage with a rear metal member 8 sealing a rear opening 7 of the solenoid 1 shown in FIG. 9, and the air and the air bubbles in the solenoid 1 can be removed by loosening or removing the adjusting screw 9.

Moreover, even among the standardized oil immersed solenoids 1 shown in FIG. 9, each solenoid 1 has its own characteristics, and the sizes of the parts constituting the solenoids 1 vary. Therefore, even if the same command electric signal is transmitted, the pulling force of the fixed magnetic pole portion 3 varies, so that the pressure and flow rate of the operating oil in the valve device vary. Therefore, the variations of each of the pressure and flow rate need to be kept within an allowable range, which is a difficult problem. This is because the allowable range of the variations is generally narrow, and there are certain limitations on reducing the variations in size of each part.

Here, as shown in FIG. 9, an adjusting spring 10 is provided. The adjusting spring 10 is configured to bias the movable core 4 in the same direction as the pulling force of the fixed magnetic pole portion 3, and the biasing force can be adjusted by the adjusting screw 9.

With this, when a predetermined command electric signal is transmitted to the solenoid 1, the biasing force of the adjusting spring 10 can be adjusted by the adjusting screw 9 in advance or accordingly such that each of the predetermined pressure and flow rate is proportional to the command electric signal and falls within a predetermined allowable range.

Another example of the oil immersed solenoid 1 is disclosed in Japanese Laid-Open Patent Application Publication No. 2006-140417 (see PTL 1 for example).

CITATION LIST

Patent Literature

PTL 1: Japanese Laid-Open Patent Application Publication No. 2006-140417

SUMMARY OF INVENTION

Technical Problem

In accordance with the conventional oil immersed solenoid 1 shown in FIG. 9, the air and the air bubbles in the space 6 of the solenoid 1 can be removed by loosening the adjusting screw 9. However, once the adjusting screw 9 is loosened, in order to put the adjusting screw 9 back to the original adjustment position, the adjusting screw 9 needs to be operated again to readjust the adjusting spring 10.

Moreover, since the adjusting screw 9 cannot be surely put back to the original adjustment position, an error occurs between the biasing force of the adjusting spring 10 readjusted by the adjusting screw 9 and the original biasing force.

Further, in a case where the adjusting screw 9 is detached from the rear metal member 8 to remove the air, the adjusting spring 10 remains in the solenoid 1. However, in a case where the oil is supplied to the solenoid 1 to cause the air in the solenoid 1 to flow out, the adjusting spring 10 may be pushed out through the screw hole 8*a* to the outside of the solenoid 1, and the adjusting spring 10 may be lost. Then, when the operator inserts the adjusting spring 10 through the screw hole 8*a* into the solenoid 1 after the removal of the air, the adjusting spring 10 may be sandwiched between the adjusting screw 9 and an inner surface of the screw hole 8*a*.

Moreover, for example, when checking the operations of the oil immersed solenoid 1 before shipment, a reasonable work procedure is to check complete removal of the air and the air bubbles in the solenoid 1 and then adjusting the biasing force of the adjusting spring 10 by the adjusting screw 9. However, since this work procedure cannot be changed, workability may deteriorate.

Further, after the adjusting screw 9 is loosened to remove the air in the oil immersed solenoid 1, the adjusting spring 10 needs to be adjusted. In addition, in a state where the oil immersed solenoid 1 is mounted on the oil-pressure device, such as the valve device, it is difficult to adjust the biasing force of the adjusting spring 10. In view of these, it is difficult to remove the air by loosening the adjusting screw 9 in a state where the oil immersed solenoid 1 is mounted on the oil-pressure device. Therefore, there is a need for the oil immersed solenoid capable of solving this problem.

The present invention was made to solve the above problem, and an object of the present invention is to provide an adjusting screw structure of an oil immersed solenoid, the adjusting screw structure being capable of removing the air in the solenoid without causing an error in biasing force of the adjusting spring adjusted by the adjusting screw and easily adjusting the biasing force of the adjusting spring and removing the air, and an oil immersed solenoid including the adjusting screw structure.

Solution to Problem

An adjusting screw structure of an oil immersed solenoid according to the present invention is an adjusting screw structure of an oil immersed solenoid in which: a movable core is provided in a space of a case so as to be movable in an axial direction; the movable core is biased by an adjusting spring in a direction in which the movable core is pulled by a fixed magnetic pole portion or in an opposite direction thereof; and an adjusting screw capable of adjusting biasing force of the adjusting spring is included, the adjusting screw structure including an air-bleeding plug configured to be detachably attached to and seal an opening end portion of the case, the opening end portion communicating with the space of the case, wherein the air-bleeding plug includes an internal screw portion with which the adjusting screw threadedly engages and a detachable mechanism configured to be able to attach the air-bleeding plug to the opening end portion of the case such that the air-bleeding plug is located at a predetermined attachment position in a movement direction of the adjusting screw.

In accordance with the adjusting screw structure of the oil immersed solenoid of the present invention, the biasing force of the adjusting spring can be adjusted by rotating the adjusting screw in a direction in which the adjusting screw is tightened or loosened. By adjusting the biasing force of the adjusting spring, it is possible to adjust the biasing force in a direction in which the movable core moves in a direction toward the fixed magnetic pole portion or in its opposite direction. With this, it is possible to adjust the oil pressure and flow rate of the operating oil or the like flowing in, for example, a valve device in which the oil immersed solenoid is used.

Then, by loosening the air-bleeding plug, the air and the air bubbles in the oil in the space of the case can be removed through the opening end portion of the case. Moreover, since the air-bleeding plug can be attached to the opening end portion of the case to be positioned at the predetermined attachment position in the movement direction of the adjusting screw, and a positional relation between the adjusting screw and the air-bleeding plug does not change even when the air-bleeding plug is attached to and detached from the opening end portion, the adjusting screw can be put back to the original position by attaching the air-bleeding plug again. Therefore, the error of the biasing force of the adjusting spring adjusted by the adjusting screw does not occur, and the readjustment by the adjusting screw becomes unnecessary.

In the adjusting screw structure of the oil immersed solenoid according to the present invention, the detachable mechanism may include: a detachable screw portion configured to attach the air-bleeding plug to the opening end portion of the case such that the air-bleeding plug threadedly engages with the opening end portion; an annular sealing portion configured to be attached to an annular groove formed on an outer peripheral surface of the air-bleeding plug; a sealing inclined surface configured to be formed in an annular shape on an inner peripheral surface of the opening end portion of the case, have an inner diameter increasing in size toward the opening, and tightly contact the annular sealing portion when the air-bleeding plug is attached at an attachment position of the opening end portion; and an air-bleeding hole configured to be formed on the air-bleeding plug and allow the space of the case and an outside of the oil immersed solenoid to communicate with each other when the air-bleeding plug is loosened.

In accordance with the detachable mechanism, the air-bleeding plug can be attached to the opening end portion of the case at the attachment position by the detachable screw portion so as to threadedly engage with the opening end portion. With the air-bleeding plug attached at the attachment position, the annular sealing portion attached to the outer peripheral surface of the air-bleeding plug tightly contacts the sealing inclined surface formed on the inner peripheral surface of the opening end portion of the case to seal the space of the case and prevent the oil in the case from leaking.

Then, when removing the air and the air bubbles in the oil in the space of the case, the air-bleeding plug is loosened. In this state, the air-bleeding hole formed on the air-bleeding plug can allow the space of the case and the outside of the oil immersed solenoid to communicate with each other, so that the air and the like in the case can be removed through the air-bleeding hole. The sealing inclined surface has an inner diameter increasing in size toward the opening. Therefore, by loosening the air-bleeding plug, a gap is formed between the sealing inclined surface and the annular sealing portion, and the air and the like in the case can be efficiently discharged through the gap to the outside.

Moreover, the air-bleeding plug may be loosened, and the air and the like in the case can be removed without detaching the air-bleeding plug from the opening end portion. Therefore, the adjusting spring in the case does not flow out through the opening end portion together with the oil, and there is no possibility of losing the adjusting spring. Then, when the operator tightens the air-bleeding plug to the opening end portion of the case after the removal of the air, the adjusting spring is not sandwiched between the adjusting screw and the inner surface of the opening end portion.

In the adjusting screw structure of the oil immersed solenoid according to the present invention, the detachable mechanism may further include a pressing inclined surface configured to be formed in an annular shape on the inner peripheral surface of the opening end portion of the case, have an inner diameter increasing in size toward the opening, be located on an opening side of the sealing inclined surface, and press the annular sealing portion into the annular groove when the air-bleeding plug threadedly engages with the opening end portion of the case to be tightened into the opening end portion.

In accordance with the detachable mechanism, when the air-bleeding plug is tightened to threadedly engage with the opening end portion of the case, the pressing inclined surface formed in an annular shape on the inner peripheral surface of the opening end portion of the case can press the annular sealing portion attached to the annular groove into the annular groove. Then, when the air-bleeding plug is further tightened, the annular sealing portion attached to the air-bleeding plug can tightly contact the sealing inclined surface formed on the inner peripheral surface of the opening end portion of the case to seal the space in the case. As above, the air-bleeding plug can be attached to the opening end portion of the case with the annular sealing portion not protruding from the annular groove, and the sealed state can be secured. Therefore, when the air-bleeding plug is tightened to be attached to the opening end portion of the case, the annular sealing portion is prevented from protruding from the annular groove and being sandwiched.

In the adjusting screw structure of the oil immersed solenoid according to the present invention, the detachable mechanism may further include a seal supporting surface configured to be formed in an annular shape on the inner peripheral surface of the opening end portion of the case, be located between the pressing inclined surface and the sealing inclined surface, and extend substantially in parallel with a center axis of the air-bleeding plug.

In accordance with the detachable mechanism, with the air-bleeding plug attached to the opening end portion of the case, the annular sealing portion in the annular groove can tightly contact the sealing inclined surface to seal the space in the case. Then, the seal supporting surface formed on the inner peripheral surface of the opening end portion of the case located on the opening side of the sealing inclined surface extends substantially in parallel with the center axis of the air-bleeding plug, and the length of the gap between the seal supporting surface and the outer peripheral surface of the air-bleeding plug becomes substantially constant at respective positions in a direction along the center axis of the air-bleeding plug. With this, the annular sealing portion can be prevented from being pushed out from the annular groove to the outside by the pressure of the oil in the case.

In the adjusting screw structure of the oil immersed solenoid according to the present invention, the adjusting spring may be a coil spring, a base end portion of the adjusting spring may fit and be attached to a first spring seat formed at a tip end portion of the adjusting screw, a tip end portion of the adjusting spring may fit and be attached to a second spring seat, and each of the first and second spring seats may include a convex stop portion configured to stop a movement in a direction in which the base end portion or tip end portion of the adjusting spring is detached therefrom.

In a case where each of the first and second spring seats includes the convex stop portion configured to stop the movement in a direction in which the base end portion or tip end portion of the adjusting spring is detached therefrom, the adjusting screw, the adjusting spring, and the second spring seat can be comparatively strongly coupled to one another by the convex stop portion. Even when the air-bleeding plug is detached from the opening end portion of the case in a case where the adjusting screw, the adjusting spring, and the second spring seat are comparatively strongly coupled to one another as above, the adjusting screw, the adjusting spring, and the second spring seat are not disassembled and can be prevented from being lost. Then, the adjusting spring is prevented from being sandwiched between the adjusting screw and the inner surface of the opening end portion when the air-bleeding plug is tightened to be attached to the opening end portion of the case after the removal of the air by the operator.

The oil immersed solenoid according to the present invention includes the adjusting screw structure of the present invention.

In accordance with the oil immersed solenoid of the present invention, the adjusting screw structure of the oil immersed solenoid of the present invention is included. Since the oil immersed solenoid of the present invention operates in the same manner as above, an explanation thereof is omitted.

Advantageous Effects of Invention

In accordance with the adjusting screw structure of the oil immersed solenoid and the oil immersed solenoid of the present invention, the air-bleeding plug can be attached to the opening end portion of the case at a predetermined attachment position in the movement direction of the adjusting screw. Therefore, the air-bleeding plug can be loosened to remove the air in the solenoid without causing the error of the biasing force of the adjusting spring adjusted by the adjusting screw. To be specific, the loosened air-bleeding plug can be put back to the original position when attached to the opening end portion of the case.

With this, the adjustment of the biasing force of the adjusting spring by the adjusting screw and the removal of the air in the solenoid can be easily carried out in a suitable order in actual operations.

Moreover, it is difficult to adjust the biasing force of the adjusting spring in a state where the oil immersed solenoid is mounted on the oil-pressure device, such as the valve device. However, in accordance with the oil immersed solenoid of the present invention, since the error of the biasing force of the adjusting spring does not occur even after the removal of the air, it is unnecessary to adjust the biasing force of the adjusting spring. Therefore, with the oil immersed solenoid mounted on the oil-pressure device, the air can be easily removed by loosening the air-bleeding plug.

DESCRIPTION OF EMBODIMENTS

Figure 1:
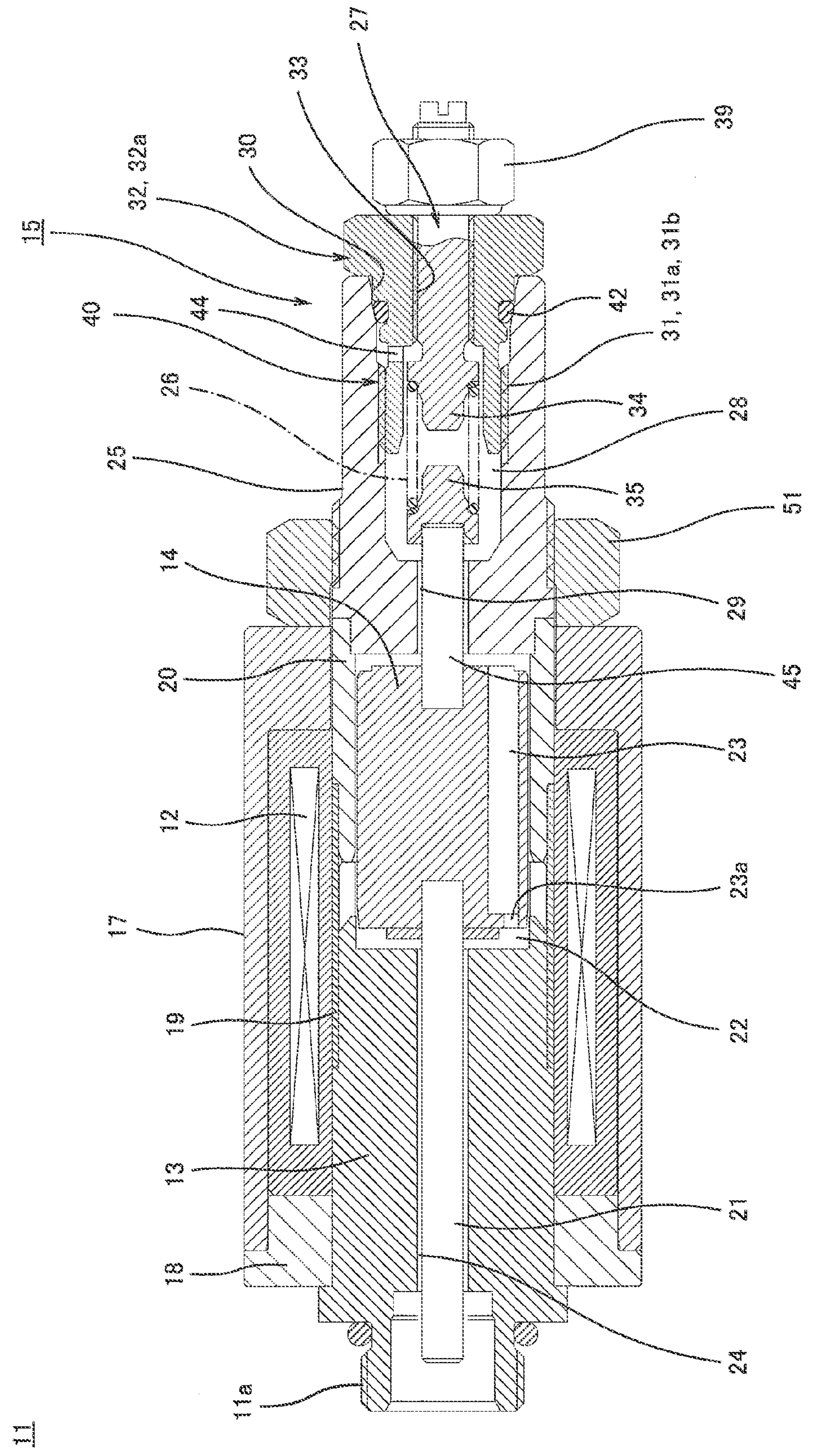
FIG. 1 is a longitudinal sectional view showing an oil immersed solenoid according to an embodiment of the present invention.

Hereinafter, an embodiment of each of an adjusting screw structure 15 of an oil immersed solenoid according to the present invention and the oil immersed solenoid including the adjusting screw structure 15 will be explained in reference to FIGS. 1 to 8. An oil immersed solenoid 11 shown in FIG. 1 is used in a fluid device (oil-pressure device), such as a valve device (not shown), used in a construction machinery (not shown) or the like. The oil immersed solenoid 11 is used to control the oil pressure and flow rate of a fluid, such as operating oil, flowing in the valve device (not shown). For example, the valve device is an electromagnetic proportional relief valve, and the oil immersed solenoid 11 is a proportional solenoid.

Figure 2:
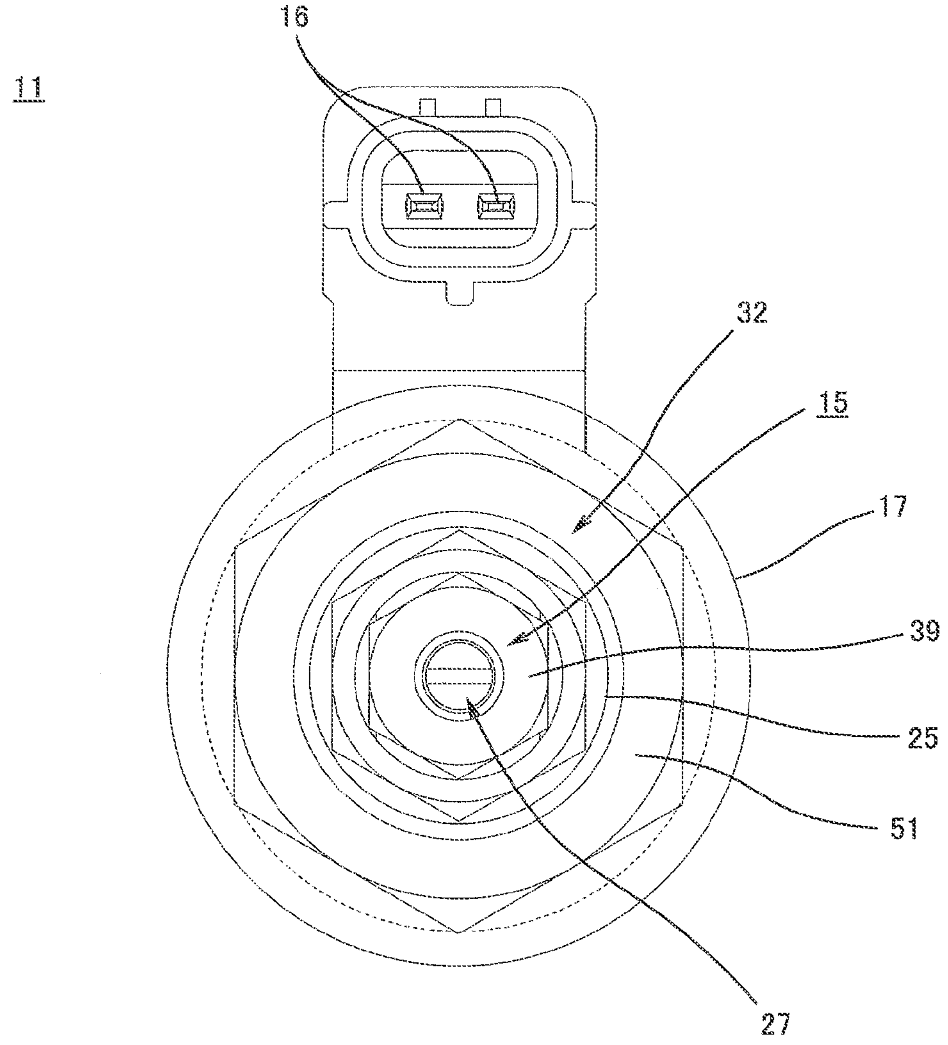
FIG. 2 is a side view showing the oil immersed solenoid according to the embodiment.

The oil immersed solenoid 11 shown in FIG. 1 includes: an exciting coil 12 to which a command electric signal (exciting current) is transmitted through terminals 16 shown in FIG. 2; a fixed magnetic pole portion 13 at which a magnetic pole is generated by the exciting coil 12; a movable core 14 configured to be pulled by the fixed magnetic pole portion 13; and the adjusting screw structure 15 of the oil immersed solenoid 11.

The exciting coil 12 shown in FIG. 1 can receive the command electric signal (exciting current) transmitted through the terminals 16 shown in FIG. 2 and generate the magnetic pole at the fixed magnetic pole portion 13 by the command electric signal. The exciting coil 12 shown in FIG. 1 is formed to have a substantially short cylindrical shape and is electrically insulated. The exciting coil 12 is accommodated in a substantially short cylindrical metal main body case 17 and an annular yoke 18.

A controller (not shown) freely adjusts the magnitude of the command electric signal within a predetermined range and transmits the command electric signal to the exciting coil 12. With this, the fixed magnetic pole portion 13 can generate pulling force (magnetic pole) corresponding to the magnitude of the command electric signal.

The magnetic pole is generated at the fixed magnetic pole portion 13 by the exciting coil 12, and the fixed magnetic pole portion 13 can pull the movable core 14 by the magnetic pole (pulling force in a left direction in FIG. 1). The pulling force corresponds to the magnitude of the command electric signal transmitted to the exciting coil 12.

As shown in FIG. 1, the fixed magnetic pole portion 13 is a magnetic body having a substantially short columnar shape and is provided on an inner side of the exciting coil 12 and the like. A tip end portion of an outer peripheral surface of the fixed magnetic pole portion 13 is positioned on an inner side of the yoke 18, and a substantially center portion of the outer peripheral surface of the fixed magnetic pole portion 13 is positioned on an inner side of a tip end portion of the exciting coil 12. Then, a rear end portion of the outer peripheral surface of the fixed magnetic pole portion 13 is positioned on an inner side of a tip end portion of a short cylindrical first guide 19. The first guide 19 is made of a non-magnetic metal.

As shown in FIG. 1, the movable core 14 is formed to have a substantially short columnar shape, provided on an inner side of a short cylindrical second guide 20, and is movable in the left and right directions in FIG. 1 along an inner surface of the second guide 20.

To be specific, the movable core 14 receives biasing force in the left direction in FIG. 1 by the pulling force of the fixed magnetic pole portion 13. When the movable core 14 is pulled by the fixed magnetic pole portion 13, a first rod 21 provided at the movable core 14 presses, for example, a spool of a valve device (not shown) in the left direction in FIG. 1. This pressing force balances push-back force (push-back force in the right direction in FIG. 1) based on, for example, spring force or pilot pressure applied to the spool. The spool stops at a position where the pressing force and the push-back force are balanced. With this, the oil pressure and flow rate of, for example, the operating oil flowing in the valve device can be controlled so as to be proportional to the command electric signal.

A tip end portion of an outer peripheral surface of the second guide 20 is positioned on an inner side of a rear end portion of the first guide 19, and a substantially center portion of the outer peripheral surface of the second guide 20 is positioned on an inner side of a rear end portion of the exciting coil 12. Then, a rear end portion of the outer peripheral surface of the second guide 20 is positioned on an inner side of a rear end portion of the main body case 17. The second guide 20 is made of a magnetic metal.

Moreover, as shown in FIG. 1, the fixed magnetic pole portion 13 is coupled to the first guide 19, and the first guide 19 is coupled to the second guide 20. The fixed magnetic pole portion 13 and the second guide 20 are provided to be spaced apart from each other. The movable core 14 is provided in a first space 22 formed in and by the fixed magnetic pole portion 13, the first guide 19, and the second guide 20. The movable core 14 is movable in the first space 22 in the left and right directions in FIG. 1.

Further, as shown in FIG. 1, a through hole 23 and a narrow hole 23*a* are formed on the movable core 14 so as to extend in parallel with an axial direction of the movable core 14 and open on both end surfaces of the movable core 14. When the movable core 14 moves, the through hole 23 and the narrow hole 23*a* allow the oil, such as the operating oil, in the first space 22 to flow therethrough, and thus, allow the movable core 14 to perform a low-impact, smooth movement by utilizing fluid resistance of the oil.

As shown in FIG. 1, the first rod 21 is provided at a tip end portion of the movable core 14. The first rod 21 is inserted in a center hole 24 so as to be movable in an axial direction. The center hole 24 is formed to penetrate the center of the fixed magnetic pole portion 13. A tip end portion of the first rod 21 contacts a rear end portion of the spool of the valve device (not shown). Moreover, a tip end portion 11*a* of the fixed magnetic pole portion 13 is coupled to the valve device.

Moreover, as shown in FIG. 1, a rear case (rear metal member) 25 having a substantially short cylindrical shape is attached to a rear end portion of the second guide 20. Then, the first and second guides 19 and 20 and fixed magnetic pole portion 13, which are coupled to the rear case 25, are fastened and fixed to the main body case 17 by a fixing nut 51. The adjusting screw structure 15 of the oil immersed solenoid 11 is provided at the rear case 25. The rear case 25 and the main body case 17 constitute a case of the oil immersed solenoid 11.

As shown in FIG. 1, the adjusting screw structure 15 can bias the movable core 14 by desired force (force set by an operator) using an adjusting spring 26 in a pulling direction (left direction in FIG. 1) in which the fixed magnetic pole portion 13 pulls the movable core 14. Thus, the adjusting screw structure 15 can adjust the force of the first rod 21 provided at the movable core 14, the force pressing the spool of the valve device. The biasing force of the adjusting spring 26 can be adjusted by operating an adjusting screw 27 by the operator.

As above, the pressing force of the first rod 21 with respect to the spool is adjusted in order that the oil pressure and flow rate of the operating oil flowing in the valve device are adjusted to become a predetermined oil pressure and flow rate corresponding to the command electric signal when the command electric signal is transmitted to the exciting coil 12.

As shown in FIG. 1, the adjusting screw structure 15 is provided at the rear case 25 having a short cylindrical shape. A second space 28 formed inside the rear case 25 communicates with the first space 22 through a center hole 29 formed on the rear case 25 and also communicates with an opening end portion 30 formed at a rear end portion of the rear case 25. An air-bleeding plug 32 is detachably attached to the opening end portion 30 via a detachable screw portion 31 so as to seal the opening end portion 30.

Moreover, the first space 22 shown in FIG. 1 is communicated with an inner portion of the valve device via the center hole 24 of the fixed magnetic pole portion 13. With this, the operating oil in the valve device flows through the center hole 24, the first space 22, the center hole 29, and the second space 28 to the opening end portion 30.

As shown in FIG. 1, the air-bleeding plug 32 has an internal screw portion 33, and the adjusting screw 27 threadedly engages with the internal screw portion 33. A first spring seat 34 is formed at a tip end portion of the adjusting screw 27, and a rear end portion of the adjusting spring 26 fits and is attached to the first spring seat 34. The adjusting spring 26 is a coil spring, and a tip end portion of the adjusting spring 26 fits and is attached to a second spring seat 35.

Figure 7:
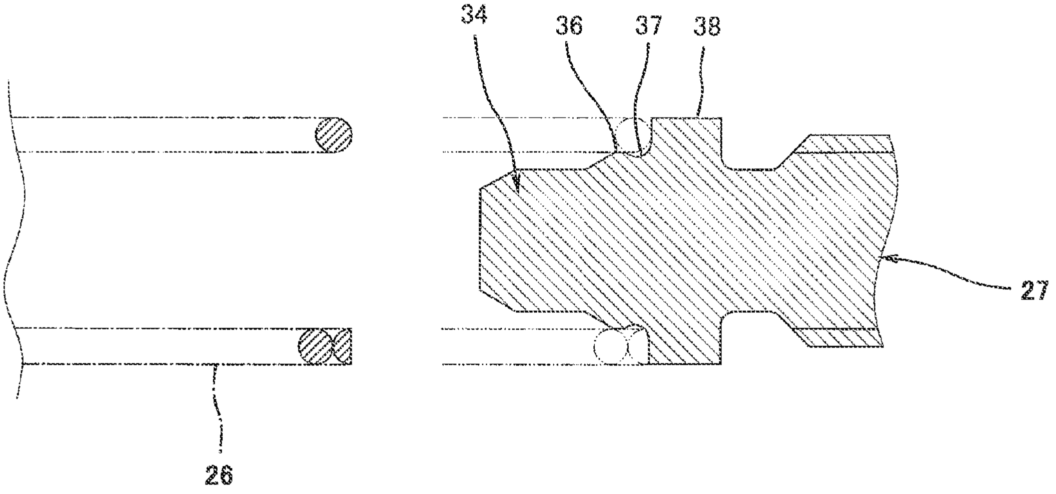
FIG. 7 is an enlarged longitudinal sectional view showing a first spring seat formed at an adjusting screw of the adjusting screw structure according to the embodiment.
Figure 8:
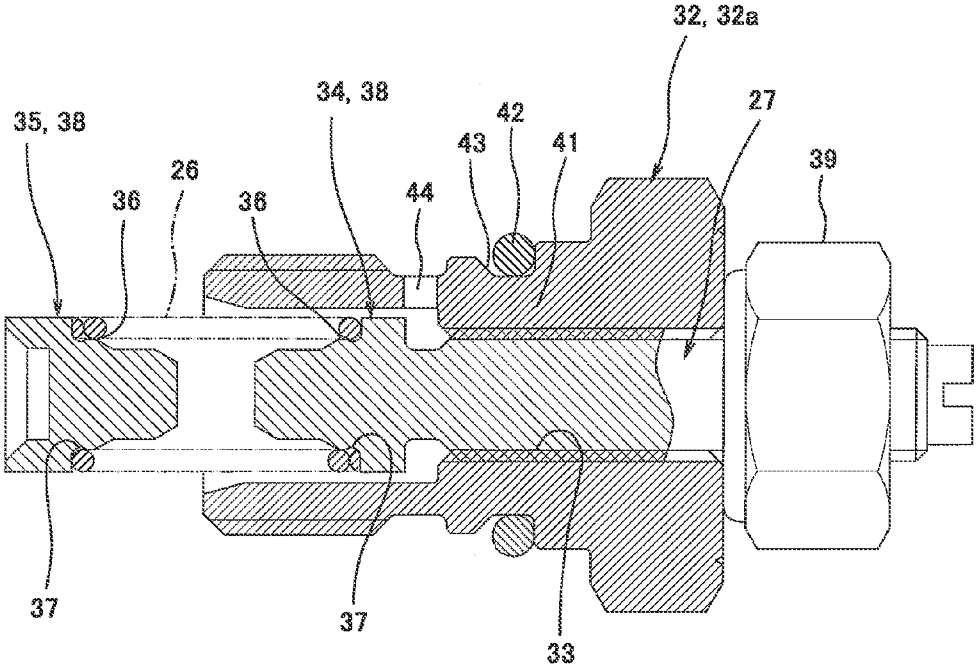
FIG. 8 is an enlarged longitudinal sectional view showing that the air-bleeding plug having the adjusting screw of the embodiment is detached from a rear case.
Figure 9:
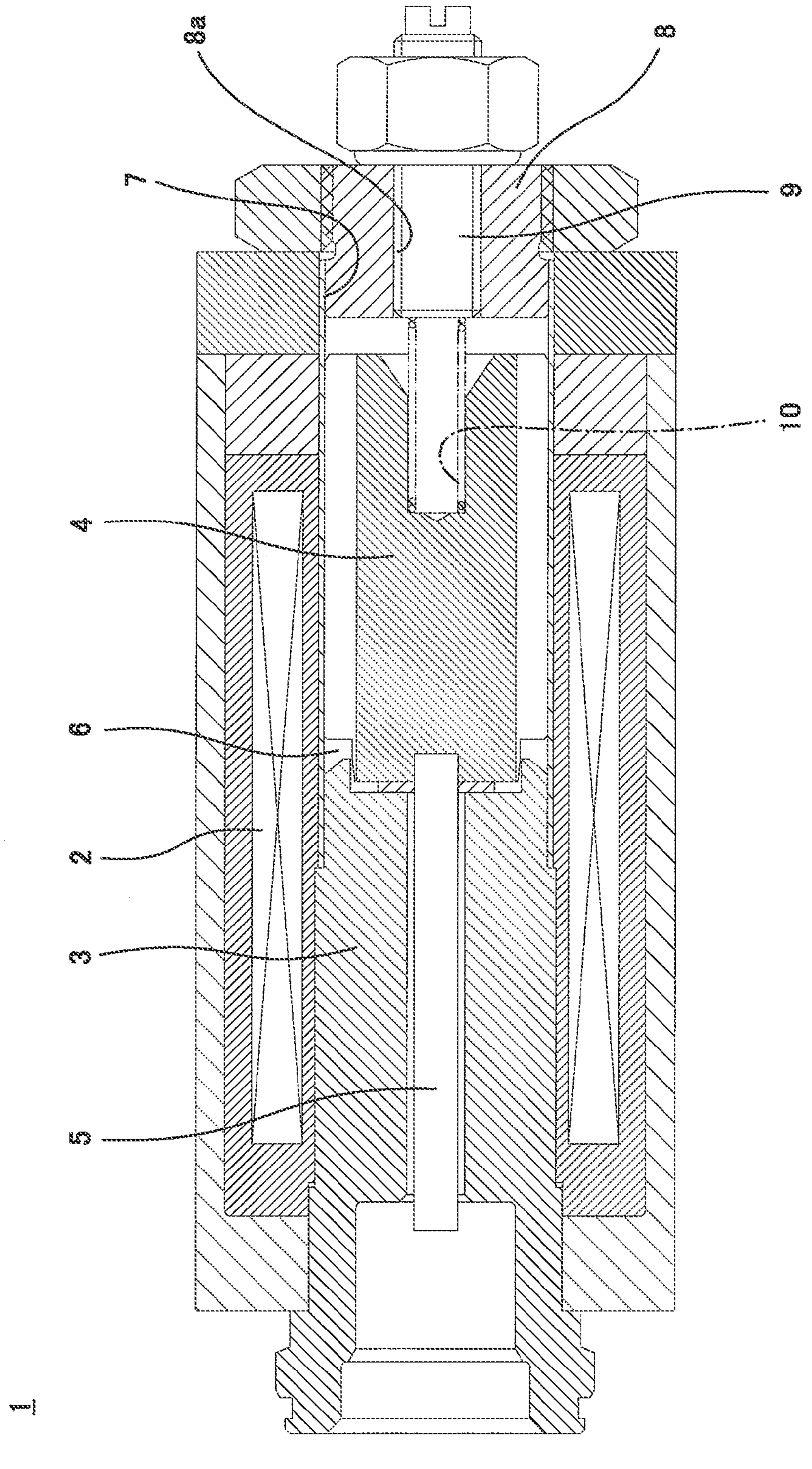
FIG. 9 is a longitudinal sectional view showing a conventional oil immersed solenoid.

Then, as shown in partially enlarged cross-sectional views of FIGS. 7 and 8, each of the first and second spring seats 34 and 35 includes a convex stop portion 36. The convex stop portion 36 stops a movement of the adjusting spring 26 in a direction in which a rear end portion or tip end portion of the adjusting spring 26 is detached therefrom. To be specific, as shown in FIG. 7, in the first spring seat 34, an engagement groove 37 to which the rear end portion of the adjusting spring 26 is attached is formed to have an annular shape, a flange portion 38 is formed at a rear edge portion of the engagement groove 37, and the convex stop portion 36 is formed at a tip end edge portion of the engagement groove 37 to have an annular shape.

As shown in FIG. 8, the second spring seat 35 has the same shape as the first spring seat 34. Therefore, the same reference signs are used for the same components, and explanations thereof are omitted. As shown in FIG. 2, a rear end portion of a second rod 45 fits a concave portion formed on a tip end surface of the second spring seat 35. The second rod 45 is inserted through the center hole 29 formed on the rear case 25, and a tip end portion thereof is coupled to the movable core 14.

Moreover, reference sign 39 shown in FIG. 8 is a seal nut. The seal nut 39 can fix the adjusting screw 27 to the air-bleeding plug 32 and seal a gap between the adjusting screw 27 and the internal screw portion 33 in a fixed state.

Next, a detachable mechanism 40 configured to detachably attach the air-bleeding plug 32 to the opening end portion 30 of the rear case 25 will be explained in reference to FIGS. 2 to 8.

Figure 3:
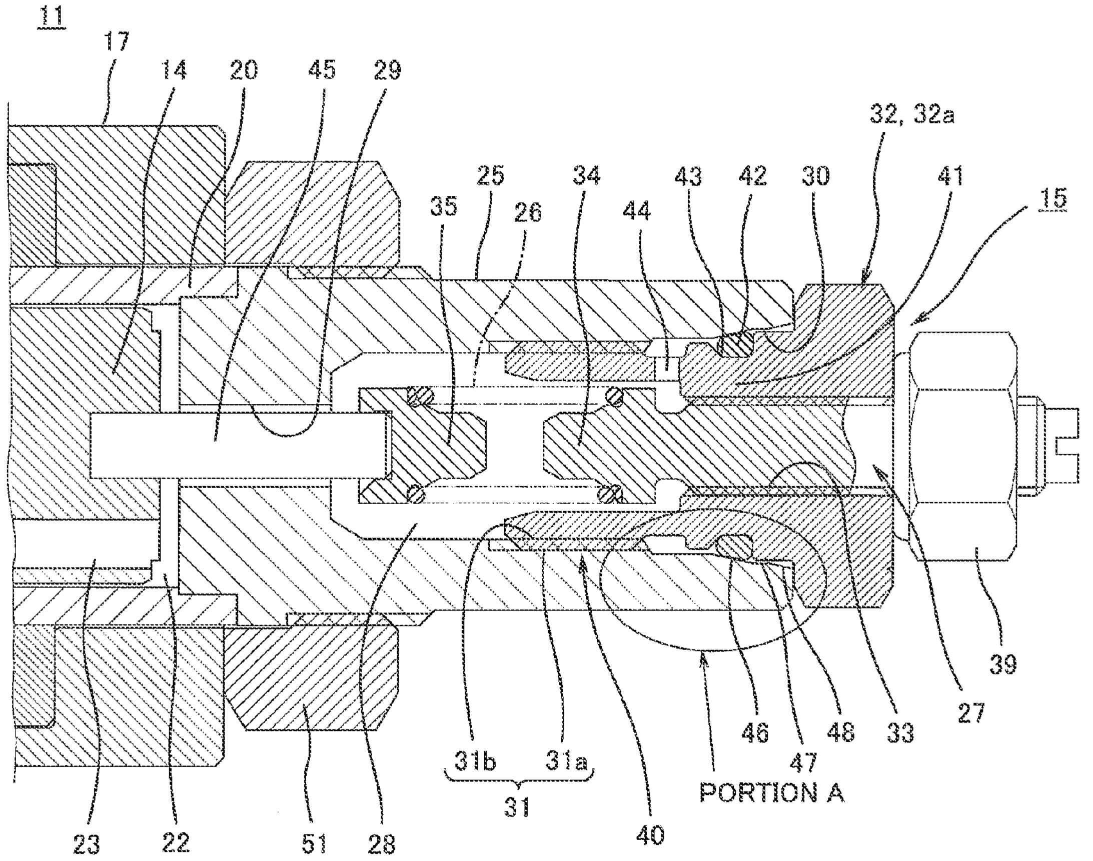
FIG. 3 is an enlarged longitudinal sectional view showing an adjusting screw structure of the oil immersed solenoid according to the embodiment.

As shown in FIGS. 2 and 3, the air-bleeding plug 32 of the detachable mechanism 40 includes a flange portion 32*a* having a substantially hexagonal plate shape. A plug main body 41 is provided on a tip end surface of the flange portion 32*a*. Then, a tip end portion of the plug main body 41 is detachably attached to an inner peripheral surface of the rear case 25 via the detachable screw portion 31. The detachable screw portion 31 includes a detachable external screw portion 31*a* formed at the tip end portion of the plug main body 41 and a detachable internal screw portion 31*b* formed on the inner peripheral surface of the rear case 25.

Figure 4:
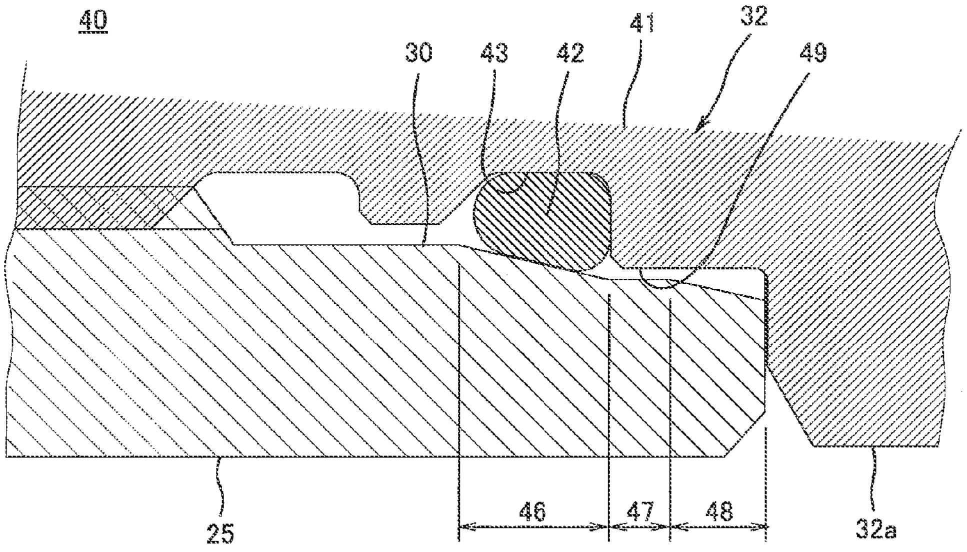
FIG. 4 is an enlarged longitudinal sectional view showing a detachable structure (portion A shown in FIG. 3) included in the adjusting screw structure according to the embodiment.

As shown in FIG. 3, when the air-bleeding plug 32 threadedly engages with the rear case 25 by the detachable screw portion 31, a front surface of the flange portion 32*a* contacts a tip end surface of the opening end portion 30 of the rear case 25. This is an attachment position at which the air-bleeding plug 32 is attached to the opening end portion 30 of the rear case 25. Thus, the air-bleeding plug 32 can be positioned at a predetermined attachment position in a movement direction (forward and backward directions) of the adjusting screw 27 to be attached to the opening end portion 30 of the rear case 25. As shown in FIGS. 3 and 4 (portion A of FIG. 3), an annular sealing portion 42, such as an O ring, is attached to an outer peripheral surface of the plug main body 41 of the air-bleeding plug 32 so as to be spaced apart from the flange portion 32*a*. The annular sealing portion 42 is attached in an annular groove 43 formed on the outer peripheral surface of the plug main body 41.

Figure 5:
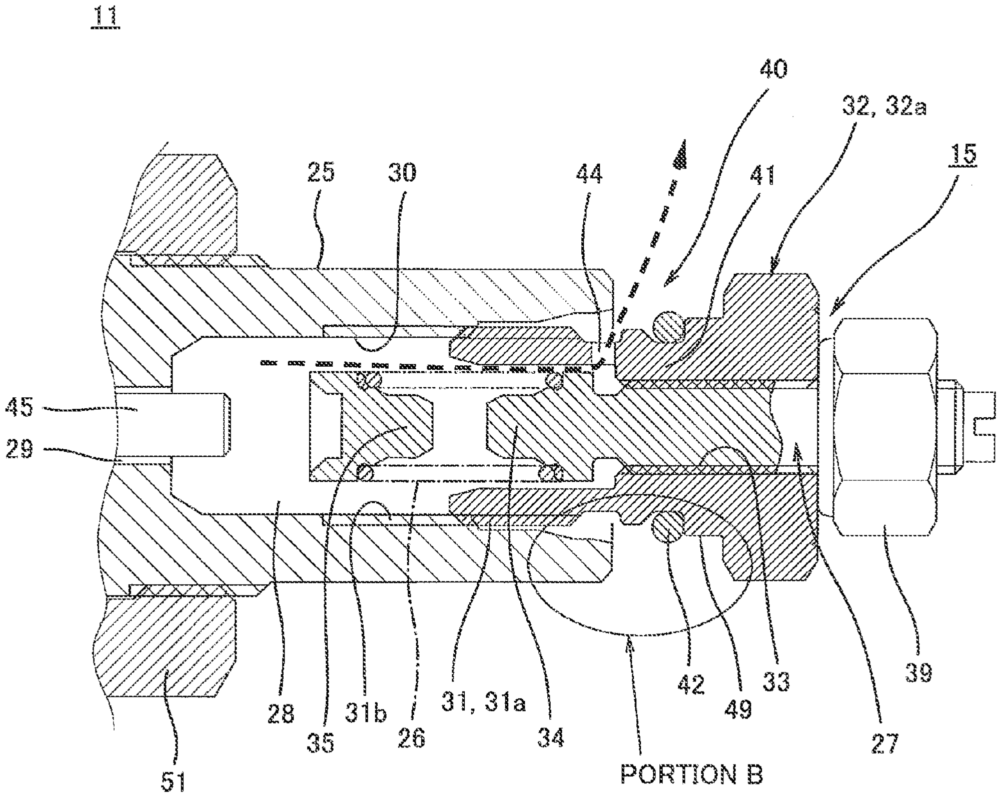
FIG. 5 is an enlarged longitudinal sectional view showing that an air-bleeding plug of the adjusting screw structure according to the embodiment is loosened to remove air.

Moreover, as shown in FIG. 3, one or a plurality of air-bleeding holes 44 are formed between the annular sealing portion 42 and the detachable external screw portion 31*a* in the plug main body 41. As shown in FIG. 5, the air-bleeding hole 44 can allow the second space 28 in the rear case 25 and the outside of the oil immersed solenoid 11 to communicate with each other in a state where the air-bleeding plug 32 is loosened but threadedly engages with the rear case 25. Therefore, with the air-bleeding plug 32 loosened, the air-bleeding hole 44 can allow the first and second spaces 22 and 28, the center hole 29, and the outside of the solenoid 11 to communicate with one another.

Further, as shown in FIG. 4, a sealing inclined surface 46, a seal supporting surface 47, and a pressing inclined surface 48 are formed on an inner peripheral surface of the opening end portion 30 of the rear case 25 in this order from a far side of the rear case 25.

As shown in FIG. 4, each of the sealing inclined surface 46 and the pressing inclined surface 48 is formed on the inner peripheral surface of the opening end portion 30 of the case so as to have an annular shape. An inner diameter of each of the sealing inclined surface 46 and the pressing inclined surface 48 increases toward the opening. The pressing inclined surface 48 is formed to have a larger diameter than the sealing inclined surface 46.

To be specific, a small-diameter edge portion of the pressing inclined surface 48 is substantially the same in diameter as a large-diameter edge portion of the sealing inclined surface 46. The seal supporting surface 47 is formed between the sealing inclined surface 46 and the pressing inclined surface 48 and is substantially the same in diameter as the large-diameter edge portion of the sealing inclined surface 46. The seal supporting surface 47 is formed to have a short cylindrical shape extending substantially in parallel with a center axis of the air-bleeding plug 32. Moreover, each of the sealing inclined surface 46 and the pressing inclined surface 48 is inclined at about 15° (for example, 10° to 20°) to the center axis of the air-bleeding plug 32.

As shown in FIG. 4, the sealing inclined surface 46 is formed to tightly contact the annular sealing portion 42 in a state where the air-bleeding plug 32 is attached at a predetermined attachment position of the opening end portion 30. Then, the seal supporting surface 47 is formed to be opposed to and spaced apart from an outer peripheral surface portion 49 of the plug main body 41. The outer peripheral surface portion 49 opposed to the seal supporting surface 47 is formed between the annular groove 43 to which the annular sealing portion 42 is attached and the flange portion 32*a*.

Figure 6:
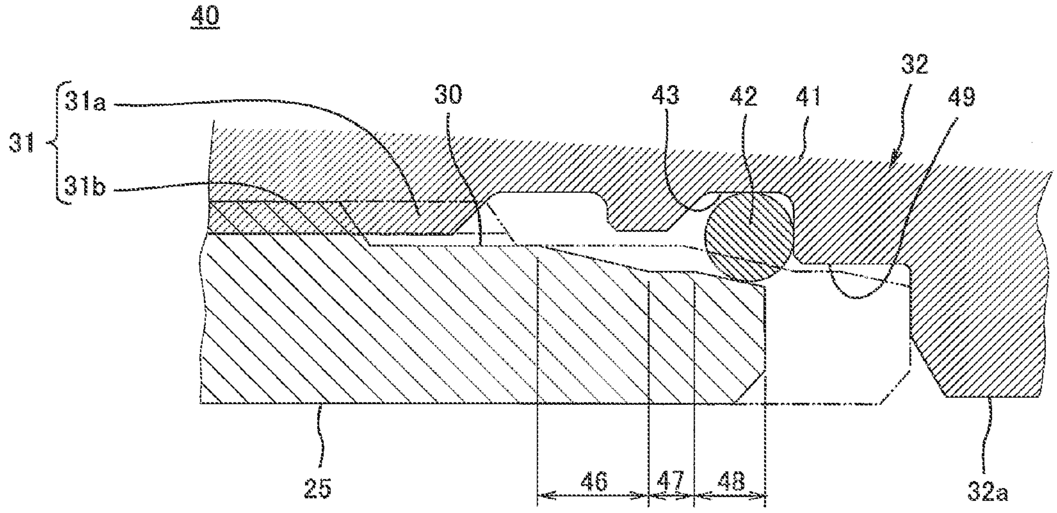
FIG. 6 is an enlarged longitudinal sectional view showing that the air-bleeding plug of the adjusting screw structure according to the embodiment is tightened (portion B shown in FIG. 5).

As shown in FIG. 6 (portion B of FIG. 5), the pressing inclined surface 48 is formed to contact the annular sealing portion 42 and press the annular sealing portion 42 into the annular groove 43 when the air-bleeding plug 32 is tightened to threadedly engage with the opening end portion 30 of the rear case 25.

To be specific, when the air-bleeding plug 32 is tightened into the opening end portion 30 of the rear case 25, the annular sealing portion 42 is prevented from protruding from the annular groove 43 and being sandwiched between the rear end portion of the rear case 25 and the flange portion 32*a*.

Next, the operations of the oil immersed solenoid 11 and adjusting screw structure 15 configured as above and shown in FIG. 1 and the like will be explained. The oil immersed solenoid 11 shown in FIG. 1 can be used to control the oil pressure and flow rate of a fluid, such as operating oil, flowing in a valve device (not shown) that is, for example, an oil-pressure device. To be specific, in the oil immersed solenoid 11, when the command electric signal (exciting current) is transmitted to the exciting coil 12, pulling force (pulling force in the left direction in FIG. 1) corresponding to the magnitude of the command electric signal is generated at the fixed magnetic pole portion 13, and the fixed magnetic pole portion 13 can pull the movable core 14 by the pulling force.

When the movable core 14 is pulled, the first rod 21 provided at the movable core 14 presses the spool of the valve device (not shown) in the left direction in FIG. 1. The pressing force balances the push-back force (push-back force in the right direction in FIG. 1) based on, for example, the spring force or pilot pressure applied to the spool. The spool stops at a position where the pressing force and the push-back force are balanced. With this, the oil pressure and flow rate of the operating oil flowing in the valve device can be controlled to be proportional to the command electric signal.

Even among the standardized oil immersed solenoids 11 shown in FIG. 1, each solenoid 11 has its own characteristics, and the sizes of the parts constituting the solenoids 11 vary. Therefore, even if the same command electric signal is transmitted, the pressure and flow rate of the operating oil vary. Therefore, the variations of each of the pressure and flow rate need to be kept within an allowable range.

Here, the operator can adjust the biasing force of the adjusting spring 26 by rotating the adjusting screw 27 of FIG. 1 in a direction in which the adjusting screw 27 is tightened or loosened. By adjusting the biasing force of the adjusting spring 26, it is possible to adjust the biasing force in a direction (left direction in FIG. 1) in which the movable core 14 moves toward the fixed magnetic pole portion 13. With this, the oil pressure and flow rate of the operating oil or the like flowing in, for example, the valve device in which the oil immersed solenoid 11 is used can be adjusted by the adjusting screw 27 in advance or accordingly such that each of the oil pressure and flow rate falls within a predetermined allowable range.

Moreover, if the air and the air bubbles exist in the oil, such as operating oil, in the first space 22 of the oil immersed solenoid 11 shown in FIG. 1, this may cause irregular change in acceleration of the movable core 14, and chattering of the movable core 14 may occur.

Here, in order to remove the air and the air bubbles in the first space 22 of solenoid 11, the operator loosens the air-bleeding plug 32 as shown in FIG. 5, so that the air and the air bubbles in the oil in the first space 22 can be removed through the second space 28 of the plug main body 41 and the air-bleeding hole 44 to the opening end portion 30 of the rear case 25 as shown by a broken line in FIG. 5.

When removing the air and the like in the first space 22, for example, the oil, such as the operating oil, can be supplied through the tip end portion 11*a* of the solenoid 11 to cause the air and the like in the first space 22 to flow out through the opening end portion 30 of the rear case 25.

Moreover, as shown in FIG. 3, when the air-bleeding plug 32 is attached to the opening end portion 30 of the rear case 25, the air-bleeding plug 32 is positioned such that the flange portion 32*a* contacts a tip end of the opening end portion 30. Thus, the air-bleeding plug 32 can be attached at a predetermined attachment position in the movement direction (forward and backward direction) of the adjusting screw 27. In addition, even if the air-bleeding plug 32 is attached to and detached from the opening end portion 30, a positional relation between the adjusting screw 27 and the air-bleeding plug 32 does not change. With this, the adjusting screw 27 can be put back to the original position by attaching the air-bleeding plug 32 at the predetermined attachment position of the opening end portion 30.

Therefore, even if the air is removed by loosening the air-bleeding plug 32, the error of the biasing force of the adjusting spring 26 adjusted by the adjusting screw 27 does not occur, so that it is unnecessary to readjust the adjusting screw 27.

Therefore, the adjustment of the biasing force of the adjusting spring 26 by the adjusting screw 27 and the removal of the air in the solenoid 11 can be easily carried out in a suitable order in actual operations.

Moreover, it is difficult to adjust the biasing force of the adjusting spring 26 in a state where the oil immersed solenoid 11 is mounted on the oil-pressure device, such as the valve device. However, in the oil immersed solenoid 11 of the present embodiment, the error of the biasing force of the adjusting spring 26 does not occur even if the air is removed. Therefore, it is unnecessary to adjust the biasing force of the adjusting spring 26. On this account, in accordance with the oil immersed solenoid 11, the removal of the air can be easily carried out by loosening the air-bleeding plug 32 in a state where the oil immersed solenoid 11 is mounted on the oil-pressure device.

Further, as shown in FIGS. 3 and 4, in accordance with the detachable mechanism 40 of the adjusting screw structure 15, the air-bleeding plug 32 can threadedly engage with the opening end portion 30 of the rear case 25 by the detachable screw portion 31 to be attached at the predetermined attachment position. Then, with the air-bleeding plug 32 attached at the predetermined attachment position, the annular sealing portion 42 attached to an outer peripheral surface of the air-bleeding plug 32 can tightly contact the sealing inclined surface 46 formed on the inner peripheral surface of the opening end portion 30 of the rear case 25 to seal the second space 28 of the rear case 25 and prevent the oil in the rear case 25 from leaking.

As shown in FIG. 5, the inner diameter of the sealing inclined surface 46 increases toward the opening of the opening end portion 30. Therefore, by loosening the air-bleeding plug 32, a gap is formed between the sealing inclined surface 46 and the annular sealing portion 42. Thus, the air and the like in the first and second spaces 22 and 28 can be efficiently discharged through this gap to the outside.

Moreover, when removing the air in the first and second spaces 22 and 28, the air-bleeding plug 32 may be loosened, and it is unnecessary to detach the air-bleeding plug 32 from the opening end portion 30. Therefore, the adjusting spring 26 and the second spring seat 35 in the rear case 25 do not flow out through the opening end portion 30 together with the oil and there is no possibility of losing the adjusting spring 26 and the second spring seat 35. Then, the adjusting spring 26 is prevented from being sandwiched between the adjusting screw 27 and the inner surface of the opening end portion 30 when the air-bleeding plug 32 is tightened to the opening end portion 30 of the case after the removal of the air by the operator.

Further, in accordance with the detachable mechanism 40, as shown in FIG. 6, when the operator tightens the air-bleeding plug 32 such that the air-bleeding plug 32 threadedly engages with the opening end portion 30 of the rear case 25, the pressing inclined surface 48 formed on the inner peripheral surface of the opening end portion 30 of the rear case 25 to have an annular shape can press the annular sealing portion 42 attached to the air-bleeding plug 32 into the annular groove 43. Then, when the air-bleeding plug 32 is further tightened up to the predetermined attachment position, as shown in FIG. 4, the annular sealing portion 42 attached to the air-bleeding plug 32 can tightly contact the sealing inclined surface 46 formed on the inner peripheral surface of the opening end portion 30 of the rear case 25 to seal the second space 28 of the rear case 25. As above, the air-bleeding plug 32 can be attached to the opening end portion 30 of the rear case 25 with the annular sealing portion 42 not protruding from the annular groove 43, and the sealed state can be secured.

Then, as shown in FIG. 4, in a state where the air-bleeding plug 32 is attached to the opening end portion 30 of the rear case 25, and the annular sealing portion 42 in the annular groove 43 tightly contacts the sealing inclined surface 46 to seal the second space 28 in the rear case 25, the seal supporting surface 47 is spaced apart from the outer peripheral surface portion 49 of the plug main body 41 to be parallel with the outer peripheral surface portion 49, and each of the seal supporting surface 47 and the outer peripheral surface portion 49 of the plug main body 41 is substantially parallel with the center axis of the air-bleeding plug 32.

In accordance with this configuration, the length of the gap between the seal supporting surface 47 and the outer peripheral surface portion 49 of the plug main body 41 becomes substantially constant at respective positions in a direction along the center axis of the air-bleeding plug 32. Therefore, it is possible to prevent the annular sealing portion 42 from being pushed out from the annular groove 43 to the outside by the oil pressure in the second space 28 of the rear case 25.

Moreover, as shown in FIGS. 7 and 8, each of the first spring seat 34 of the adjusting screw 27 and the second spring seat 35 includes the convex stop portion 36 configured to stop the movement of the adjusting spring 26 in a direction in which the rear end portion or tip end portion of the adjusting spring 26 is detached therefrom. Therefore, the adjusting screw 27, the adjusting spring 26, and the second spring seat 35 can be comparatively strongly coupled to one another by the convex stop portions 36. Even when the air-bleeding plug 32 is detached from the opening end portion 30 of the rear case 25 in a case where the adjusting screw 27, the adjusting spring 26, and the second spring seat 35 are comparatively strongly coupled to one another as above, the adjusting screw 27, the adjusting spring 26, and the second spring seat 35 are not disassembled and can be prevented from being lost. Then, the adjusting spring 26 is prevented from being sandwiched between the adjusting screw 27 and the internal screw portion 33 on the inner surface of the opening end portion 30 when the air-bleeding plug 32 is tightened to be attached to the opening end portion 30 of the rear case 25 after the removal of the air by the operator.

Further, as shown in FIG. 1, since the adjusting screw 27, the air-bleeding plug 32, the movable core 14, and the first and second rods 21 and 45 are provided on the same straight line, the configuration of the oil immersed solenoid 11 becomes simple. Then, the operator can maintain the same posture toward the air-bleeding plug 32 when carrying out the removal of the air and the adjustment of the biasing force with respect to the movable core 14 by the adjusting screw 27. Therefore, the workability is excellent.

In the above embodiment, as shown in FIGS. 5 and 6, although the sealing inclined surface 46, the seal supporting surface 47, and the pressing inclined surface 48 are formed on the inner peripheral surface of the opening end portion 30 of the rear case 25 and the air-bleeding hole 44 is formed on the air-bleeding plug 32, these may be omitted. In this case, when removing the air and the air bubbles in the first and second spaces 22 and 28, the air-bleeding plug 32 may be loosened to remove the air and the like through a gap at the detachable screw portion 31 or the air-bleeding plug 32 may be detached from the rear case 25 to remove the air and the like.

Then, in the above embodiment, as shown in FIG. 1, the adjusting spring 26 is a compression coil spring configured to bias the movable core 14 in a direction in which the movable core 14 is pulled by the fixed magnetic pole portion 13. Instead of this, the adjusting spring 26 may be a tension coil spring configured to bias the movable core 14 in a direction opposite to the above pulling direction.

REFERENCE SIGNS LIST

11 oil immersed solenoid
11*a* tip end portion
12 exciting coil
13 fixed magnetic pole portion
14 movable core
15 adjusting screw structure
16 terminal
17 main body case
18 yoke
19 first guide
20 second guide
21 first rod
22 first space
23 through hole
23*a* narrow hole
24, 29 center hole
25 rear case
26 adjusting spring
27 adjusting screw
28 second space
30 opening end portion
31 detachable screw portion
31*a* detachable external screw portion
31*b* detachable internal screw portion
32 air-bleeding plug
32*a*, 38 flange portion
33 internal screw portion
34 first spring seat
35 second spring seat
36 convex stop portion
37 engagement groove
39 seal nut
40 detachable mechanism
41 plug main body
42 annular sealing portion
43 annular groove
44 air-bleeding hole
45 second rod
46 sealing inclined surface
47 seal supporting surface
48 pressing inclined surface
49 outer peripheral surface portion
51 fixing nut

The invention claimed is:

1. An adjusting screw structure of an oil immersed solenoid comprising:

a movable core provided in a space of a case so as to be movable in an axial direction, the movable core being biased by an adjusting spring in a direction in which the movable core is pulled by a fixed magnetic pole portion or in an opposite direction thereof; and an adjusting screw structure capable of adjusting biasing force of the adjusting spring, the adjusting screw structure comprising an air-bleeding plug configured to be detachably attached to and seal an opening end portion of the case, the opening end portion communicating with the space of the case;

wherein the air-bleeding plug includes an internal screw portion with which the adjusting screw structure threadedly engages, and a detachable mechanism configured to attach the air-bleeding plug to the opening end portion of the case such that the air-bleeding plug is located at a predetermined attachment position in a movement direction of the adjusting screw structure, and wherein the detachable mechanism includes:

a detachable screw portion configured to attach the air-bleeding plug to the opening end portion of the case such that the air-bleeding plug threadedly engages with the opening end portion;

an annular sealing portion configured to be attached to an annular groove formed on an outer peripheral surface of the air-bleeding plug;

a sealing inclined surface configured to be formed in an annular shape on an inner peripheral surface of the opening end portion of the case, have an inner diameter increasing in size toward the opening, and tightly contact the annular sealing portion when the air-bleeding plug is attached at an attachment position of the opening end portion; and an air-bleeding hole configured to be formed on the air-bleeding plug and allow the space of the case and an outside of the oil immersed solenoid to communicate with each other when the air-bleeding plug is loosened.

2. The adjusting screw structure according to claim 1, wherein:

the adjusting spring is a coil spring;

a base end portion of the adjusting spring fits and is attached to a first spring seat formed at a tip end portion of the adjusting screw structure;

a tip end portion of the adjusting spring fits and is attached to a second spring seat; and each of the first and second spring seats includes a convex stop portion configured to stop a movement in a direction in which the base end portion or tip end portion of the adjusting spring is detached therefrom.

3. An oil immersed solenoid comprising the adjusting screw structure according to claim 1.

4. The adjusting screw structure according to claim 1, wherein the detachable mechanism further includes a pressing inclined surface configured to be formed in an annular shape on the inner peripheral surface of the opening end portion of the case, have an inner diameter increasing in size toward the opening, be located on an opening side of the sealing inclined surface, and press the annular sealing portion into the annular groove when the air-bleeding plug threadedly engages with the opening end portion of the case to be tightened into the opening end portion.

5. The adjusting screw structure according to claim 4, wherein the detachable mechanism further includes a seal supporting surface configured to be formed in an annular shape on the inner peripheral surface of the opening end portion of the case, be located between the pressing inclined surface and the sealing inclined surface, and extend substantially in parallel with a center axis of the air-bleeding plug.

* * * * *

UNITED STATES PATENT AND TRADEMARK OFFICE

CERTIFICATE OF CORRECTION

PATENT NO. : 8,505,874 B2
APPLICATION NO. : 13/063188
DATED : August 13, 2013
INVENTOR(S) : Hiroaki Shimizu It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 264 days.

Signed and Sealed this
Fifteenth Day of September, 2015

Michelle K. Lee
*Director of the United States Patent and Trademark Office*